US008786840B1

(12) United States Patent
Woodruff et al.

(10) Patent No.: US 8,786,840 B1
(45) Date of Patent: Jul. 22, 2014

(54) METHOD AND DEVICE FOR REMOTELY MONITORING AN AREA USING A LOW PEAK POWER OPTICAL PUMP

(75) Inventors: Steven D. Woodruff, Morgantown, WV (US); Dustin L. Mcintyre, Washington, PA (US); Jinesh C. Jain, Southpark, PA (US)

(73) Assignee: U.S. Department of Energy, Washington, DC (US)

( * ) Notice: Subject to any disclaimer, the term of this patent is extended or adjusted under 35 U.S.C. 154(b) by 128 days.

(21) Appl. No.: 13/358,853

(22) Filed: Jan. 26, 2012

(51) Int. Cl.
*G01J 3/00* (2006.01)
*G01J 3/30* (2006.01)
*H01S 3/093* (2006.01)
*H01S 3/11* (2006.01)

(52) U.S. Cl.
USPC .............. 356/72; 356/300; 356/318; 372/72; 372/17

(58) Field of Classification Search
USPC .......................... 372/70–72, 75; 356/301, 318
See application file for complete search history.

(56) References Cited

U.S. PATENT DOCUMENTS

| 7,421,166 | B1 | 9/2008 | Woodruff et al. | |
| 8,036,253 | B2* | 10/2011 | Jiang et al. | 372/11 |
| 2004/0047375 | A1* | 3/2004 | Rodin et al. | 372/10 |
| 2005/0078730 | A1* | 4/2005 | Holsinger et al. | 372/70 |

OTHER PUBLICATIONS

Gary, Kelly "Managing Carbon in a World Economy: The Role of American Agriculture [comments] Great Plains Natural Resources" Journal, vol. 9, Issue 2 (Spring 2005), pp. 18 & 23 http://heinonline.org/HOL/Page?handle=hein.journals/gpnat9&div=14&g_sent=1&collection=journals#118.*
Gary, KellyManaging Carbon in a World Economy: The Role of American Agriculture [comments] Great Plains Natural Resources Journal, vol. 9, Issue 2 (Spring 2005), pp. 18 &23. Connellhttp://heinonline.org/HOL/Page ?men_tab=srchresults&handle=hein.journals/gpnat9&id=123&size=2&collection=journals.*

* cited by examiner

*Primary Examiner* — Kara E. Geisel
*Assistant Examiner* — Maurice Smith
(74) *Attorney, Agent, or Firm* — Michael J. Dobbs; Daniel Park; John T. Lucas

(57) ABSTRACT

A method and device for remotely monitoring an area using a low peak power optical pump comprising one or more pumping sources, one or more lasers; and an optical response analyzer. Each pumping source creates a pumping energy. The lasers each comprise a high reflectivity mirror, a laser media, an output coupler, and an output lens. Each laser media is made of a material that emits a lasing power when exposed to pumping energy. Each laser media is optically connected to and positioned between a corresponding high reflectivity mirror and output coupler along a pumping axis. Each output coupler is optically connected to a corresponding output lens along the pumping axis. The high reflectivity mirror of each laser is optically connected to an optical pumping source from the one or more optical pumping sources via an optical connection comprising one or more first optical fibers.

15 Claims, 5 Drawing Sheets

METHOD AND DEVICE FOR REMOTELY MONITORING AN AREA USING A LOW PEAK POWER OPTICAL PUMP

GOVERNMENT INTERESTS

The United States Government has rights in this invention pursuant to the employer-employee relationship between the Government and the Inventors.

CROSS-REFERENCE TO RELATED APPLICATIONS

1. Field of the Invention

The present invention relates to a method and device for remotely monitoring an area using a low peak power optical pump, preferably for $CO_2$ monitoring or borehole monitoring.

2. Background of the Invention

The low-cost, efficient monitoring of remote locations has and continues to be highly sought in the industry. For example, when drilling a production or injection well for oil/gas production or $CO_2$ storage it is always helpful to know the location of the drill head in terms of geometry and in terms of stratigraphy. Geologic strata can vary significantly over both a basin and production field scale due to variations in depositional terrain in the past or more recent geologic activity. As the drill may be under tremendous pressure and temperatures in extreme environments, it is difficult to monitor conditions during drilling or even with the drill still in the well bore. Therefore, drilling operations are often suspended, and the drill removed, in order to examine the well bore.

In yet another example, recently there has been a tremendous interest in $CO_2$ sequestration. Safe, efficient and effective $CO_2$ sequestration requires a low-cost reliable means for monitoring $CO_2$. Therefore, new efficient and effective remote monitoring of sequestered $CO_2$ solutions are highly sought as $CO_2$ sequestration and storage commonly encompass large and fragmented areas and are in extreme environments.

Efforts have been made to use lasers for remote monitoring. Generally, a high-power lasing power is produced at a local location and sent to a remote location via an optical fiber. In these systems, optical fibers limit the peak power of the lasing power transferred. These systems pose a serious risk to users in the area if an optical fiber is damaged, resulting in dangerous lasing power emissions in the area. Other remote monitoring technologies generate lasing power at the remote location, requiring complex electronics at the remote location. An optical response is detected and analyzed directly at the remote location. These systems are prone to fluctuations in output and measurements due to changing pressures and temperatures at the remote location, particularly in extreme environments, for example down hole drilling.

SUMMARY OF THE INVENTION

A method and device for remotely monitoring an area using a low peak power optical pump comprising one or more pumping sources, one or more lasers; and an optical response analyzer. Each pumping source from the one or more pumping sources creates a pumping energy.

The one or more lasers each comprise a high reflectivity mirror, a laser media, an output coupler, and an output lens. Each laser media is made of a material that emits a lasing power when exposed to pumping energy. The lasing power has a peak power greater than the peak power of the pumping energy. Each high reflectivity mirror is reflective to the lasing power and transmissive to said pumping energy. Each laser media is optically connected to and positioned between a corresponding high reflectivity mirror and output coupler along a pumping axis. Each output coupler is optically connected to a corresponding output lens along the pumping axis. In various embodiments, one or more coupling lens are used to couple the various optical components. The high reflectivity mirror of each laser optically is optically connected to an optical pumping source from the one or more optical pumping sources via an optical connection comprising one or more first optical fibers. Preferably, a first coupling lens is used to couple the output of the first optical fiber to each laser. Preferably, at least one laser comprises an output lens optically connected to and between its corresponding output coupler and sample area along its pumping axis.

In a preferred embodiment, at least one laser form the one or more lasers further comprise a Q-switch. Each Q-switch is optically connected to and positioned between the corresponding high-reflectivity mirror and the corresponding optical coupler along the pumping axis of the corresponding laser. In one embodiment, a Q-switch is positioned between its corresponding high reflectivity mirror and laser media. In another embodiment, a Q-switch is positioned between its corresponding laser media and output coupler.

Each output lens is optically connected to a sample area. Each sample area is optically connected to the optical response analyzer via one or more optical fibers. Preferably, the sample area is optically connected to the optical response analyzer via a response optical fiber, separate and distinct from the first optical fiber. In an alternative embodiment, the sample area is optically connected to the optical response analyzer via an optical path comprising at least part of said first optical fiber. The optical response analyzer preferably uses laser-induced breakdown spectroscopy or RAMAN scattering to analyze the optical response.

DETAILED DESCRIPTION OF THE INVENTION

Figure 1A:
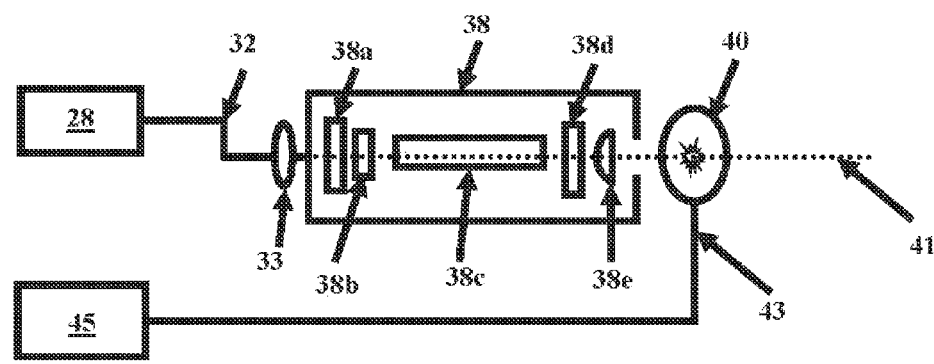
FIG. 1a depicts one embodiment of a device for a remote sensor using a low peak power optical pump whereby an optical fiber optically connects the sample area to the optical response analyzer and the Q-Switch is adjacent to the high reflectivity mirror.

A method and device for remotely monitoring an area using a low peak power optical pump comprising one or more pumping sources, one or more lasers; and an optical response analyzer. Each pumping source from the one or more pumping sources creates a pumping energy.

The one or more lasers each comprise a high reflectivity mirror, a laser media, an output coupler, and an output lens. Each laser media is made of a material that emits a lasing power when exposed to pumping energy. The lasing power has a peak power greater than the peak power of the pumping energy. Each high reflectivity mirror is reflective to the lasing power and transmissive to said pumping energy. Each laser media is optically connected to and positioned between a corresponding high reflectivity mirror and output coupler along a pumping axis. Each output coupler is optically connected to a corresponding output lens along the pumping axis. In various embodiments, one or more coupling lens are used to couple the various optical components. The high reflectivity mirror of each laser is optically connected to an optical pumping source from the one or more optical pumping sources via an optical connection comprising one or more first optical fibers. Preferably, a first coupling lens is used to couple the output of the first optical fiber to each laser. Preferably, at least one laser comprises an output lens optically connected to and between its corresponding output coupler and sample area along its pumping axis.

In a preferred embodiment, at least one laser from the one or more lasers further comprise a Q-switch. Each Q-switch is optically connected to and positioned between the corresponding high-reflectivity mirror and the corresponding optical coupler along the pumping axis of the corresponding laser. In one embodiment, a Q-switch is positioned between its corresponding high reflectivity mirror and laser media. In another embodiment, a Q-switch is positioned between its corresponding laser media and output coupler.

Each output lens is optically connected to a sample area. Each sample area is optically connected to the optical response analyzer via one or more optical fibers. Preferably, the sample area is optically connected to the optical response analyzer via a response optical fiber, separate and distinct from the first optical fiber. In an alternative embodiment, the sample area is optically connected to the optical response analyzer via an optical path comprising at least part of said first optical fiber. The optical response analyzer preferably uses laser-induced breakdown spectroscopy or RAMAN scattering to analyze the optical response.

In one preferred embodiment, pumping energy is produced at a first location above ground and directed to a sample within a borehole below ground. In another preferred embodiment, sequestered $CO_2$ is stored at a plurality of remote locations and pumping energy is directed to each said remote location. Preferably, in this embodiment, the optical response is analyzed by the optical response analyzer for a change in $CO_2$ concentration.

One or More Optical Pumping Sources

The one or more pumping sources produce optical pumping energy preferably having low peak power, preferably less than 1,000 peak Watts, more preferably about 500-1,000 Watts. Preferably, the peak power of the optical pumping energy is optimized depending on factors comprising the high reflectivity mirror, Q-switch, laser media, output coupler, output lens, desired lasing power, other optical components in the system, combinations thereof, etc. The optical pumping energy may be a single pulse, as in the preferred embodiment, a continuous stream, or a series of pulses. In the preferred embodiment, the one or more pumping sources are each a laser diode providing optical pumping energy in the form of a single pulse having a low power (less than 1,000 peak Watts).

Preferably, the one or more pumping sources are positioned above ground in an ambient environment protected from changes in pressure and temperature thereby producing consistent and reliable pumping energy.

Optical Response Analyzer

The optical response analyzer is optically connected to the sample area and receives the optical response. The optical response analyzer is preferably optically connected to the sample area via an optical fiber, preferably the first optical fiber, alternatively a different fiber. The optical response is analyzed, preferably by analyzing various optical factors, for example, frequency, amplitude, bandwidth, etc. In a preferred embodiment, the optical response analyzer uses laser-induced breakdown spectroscopy (LIBS), RAMAN scattering, or a combination thereof. Preferably, the optical response analyzer is positioned above ground in an ambient environment protected from changes in pressure and temperature thereby minimizing interference due to changing or extreme conditions.

In one embodiment, the optical response analyzer uses laser-induced breakdown spectroscopy (LIBS). Preferably, in this embodiment, the lasing energy is focused to form plasma, which atomizes and excites a small sample of material in the sample area, generating a plasma plume, thereby creating an optical response having emissions characteristic of atomic emission lines of the elements present. Further details on LIBS may be found in the art, for example as described in U.S. Pat. No. 7,092,087, hereby fully incorporated by reference. In this embodiment, the laser is preferably optimized to output one large pulse at a low repetition rate. Preferably, the lasing power is focused thereby producing a high energy beam within the sampling area, but not as to damage any nearby optics.

In one embodiment, the optical response analyzer uses RAMAN scattering. In this embodiment, the laser is preferably optimized to output a high repetition pulse train of low power pulses. Preferably, in this embodiment, the optical response is a processed by a monochromator, preferably filtering out the lasing energy, resulting in a spectral signature of the optical response, which one skilled in the art can determine the presence or absence of any number of compositions (e.g. by the shift in energy from the lasing energy). Further details on RAMAN scattering may be found in the art, for example as described in U.S. Pat. No. 5,450,193, hereby fully incorporated by reference. In one embodiment, RAMAN scattering analysis is performed and the laser does not include a Q-switch, due to a sufficient continuous wave gain. In one embodiment, the optical response is fed through a frequency doubler, trippler, quadrupler, or a combination thereof. In one embodiment, the optical response is fed through a doubler to shift the optical response to the visible spectrum and then use a visible spectrometer to measure the RAMAN shift. Preferably, the lasing power is slightly focused enabling more efficient coupling to the spectrometer and thereby producing a stronger shift signal.

First Coupling Lens

The first coupling lens forms the lasing into the desired pattern, preferably focused on the laser media. Preferably, the first couplings lens is optimized for optically transparent to the pumping energy. Preferably, the first coupling lens is made of a material comprising glass.). Further details on coupling lens scattering may be found in the art, for example as described in U.S. Pat. No. 7,668,421, hereby fully incorporated by reference.

Optical Fibers

The optical fibers transport optical energy, preferably with minimal attenuation to the optical energy. Preferably, the first coupling lens is made of a material comprising glass.

The Output Lens

The output lens forms the lasing into the desired pattern. For example, in one embodiment, LIBS analysis is performed on the sample area and the output lens 38e focuses the lasing power into a high energy beam of a sufficiently small spot size so as to create a beam, preferably about the power density or photon flux density of about $1\times10^{11}$ W/cm$^2$. Different pressures and air will require a different power density. For example, at higher pressures or in liquids the breakdown requirements are significantly less. For instance, if air having an AQI (Air Quality Index) of 49 is used about $1\times10^{13}$ W/cm$^2$ of power density or photon flux density will be required. In an alternative embodiment, RAMAN analysis is performed whereby the output lens focuses the lasing power into the desired shape and size sampling area.

Laser

Each laser comprises a high reflectivity mirror, a laser media, an output coupler, and an output lens. Preferably, each laser further comprises a Q-switch, although in some embodiments the Q-switch is omitted. The Q-switch is preferably Cr:YAG (chromium-doped yttrium aluminium garnet), having enough Cr such that the small signal transmission of the lasing power is in the range of 10-70%. In an alternative embodiment, preferably for embodiments whereby the optical response analyzer uses RAMAN scattering, the Q-switch is omitted.

The laser media is preferably made of one of the plurality of materials as discussed in Koechner, W., Bass, M., "Solid-State Lasers: A Graduate Text" Springer, New York 2003, hereby fully incorporated by reference. The laser media is preferably a doped host material, preferably Glasses, crystals such as oxides, Oxides, Garnets, Vanadates, and Fluorides, and ceramics. The Glasses are preferably doped with Nd, Er, or Yb. The Oxides such as sapphire is preferably doped with Ti. The Garnets are Yttrium Aluminum Garnet $Y_3Al_5O_{12}$ (YAG), Gadolinium Gallium Garnet $Gd_3Ga_5O_{12}$ (GGG), and Gadolinium Scandium Aluminum Garnet $Gd_3Sc_2Al_3O_{12}$ (GSGG) and are preferably doped with rare earths such as Nd, Tm, Er, Ho, Yb. The Vanadates or Yttrium Orthovanadate ($YVO_4$) is preferably doped with Nd. The Fluorides or Yttrium Fluoride ($YLiF_4$) and is preferably doped with Nd. The laser media is preferably Nd:YAG (neodymium-doped yttrium aluminium garnet), Nd:Glass (neodymium-doped glass), Nd:YLF (neodymium-doped yttrium lithium fluoride), Nd:YVO$_4$ (Yttrium Vanadate), Er:Glass (Erbium doped glass), Yb:YAG (ytterbium-doped yttrium aluminium garnet), Alexandrite, Ti:Sapphire (Titanium-sapphire). In the preferred embodiment the laser media is Nd:YAG having about 0.5% atomic weight of Nd, which will emit lasing power at about 1064 nm. The dopant level of the laser media is intentionally low to improve the performance of the laser. Lowering the dopant concentration affects the overall output by modifying the beam overlap, the absorption depth of the optical pumping energy, reducing thermal lensing losses, and reducing losses due to ASE (Amplified Spontaneous Emission). This leads to a much more uniform pumped gain profile as well as more uniformly distributed thermal stresses which lessens the effects of thermal lensing. The reduction of dopant concentration lowers the gain of the material slightly but offers larger energy storage capacity in return. The lasing power produced by the laser media has a peak power greater than the pumping energy. Peak power is the maximum energy produced by a generation facility over a fixed period of time.

The high reflectivity mirror allows optical pumping energy emitted from the first optical fiber, to pass through, while reflecting the lasing power. Preferably, the high reflectivity mirror is glass, fused silica, or sapphire having a reflective coating that is reflective to the lasing power, and an anti-reflective coating that is transparent to the pumping energy. More preferably, the high reflectivity mirror is fused silica having a reflective coating that is reflective to the lasing power, and an anti-reflective coating that is transparent to the pumping energy.

The output coupler partially reflects the lasing power, preferably less than 50% of the lasing power is reflected. In the current, preferred embodiment, the output coupler reflects about 10-50% of the lasing power.

The output lens focuses the lasing power into the high energy beam. In a preferred embodiment, the lens is a convex lens having a focal point of about one centimeter inside the sample area.

The one or more pumping sources, coupling optics, first optical fiber, and combinations thereof preferably have anti-reflection coatings. The anti-reflection coatings reduce the optical losses through the system and improve the transmission efficiency of the system.

In one embodiment, optics are added to a first laser allowing the first laser to pass through the optical response from the sample area. Preferably, in this embodiment, the first laser further comprises a first lens, a first mirror, a second lens, a second mirror, a third lens, a third mirror, and a fourth mirror. The first mirror is optically connected to and positioned between the first lens and the second lens along its pumping axis. The high reflectivity mirror, the Q-switch, the laser media, the optical coupler, and the output lens of the first laser are all positioned between the second lens and the second mirror along the pumping axis. The second mirror is optically connected to and positioned between the output lens and the third lens along the pumping axis of the first laser. The third lens optically is connected to the second mirror and the sample area along the pumping axis of the first laser. The third mirror is optically connected to the second mirror. The third mirror is optically connected to the fourth mirror. The fourth mirror is optically connected to the first mirror.

In another embodiment, the lasers comprise a first laser and a second laser. Preferably, this embodiment comprises a fifth and sixth mirror, whereby the fifth mirror is optically connected to the high reflectivity mirror the second laser. The sixth mirror is optically connected to the fifth mirror. The sixth mirror is optically connected to the sample area. Preferably, the plurality of lasers are configured to produce lasing power at the sample area at different times. In one embodiment, the first laser is optically connected to a first pumping source and the second laser is optically connected to a different second pumping source. In yet another embodiment, the same pumping source is optically connected to both the first laser and the second laser, but a delay is produced via a longer optical fiber connection to one of the lasers. In another embodiment, the output of the second laser is optically connected a fifth mirror optically connected to a sixth mirror optically connected to a seventh mirror optically connected to eight mirror optically connected to the sample area, thereby causing an optical delay in the lasing power from the second laser.

In the preferred embodiment, a window is placed between the output lens and the sample area. The window seals the laser and is scaled to resist any external temperature and pressure, for example from within a borehole, the sample area, etc. Preferably, the window is made of a material comprising fused silica, sapphire, or a combination thereof.

Alternatively, all or any pair of the output lens, output coupler, and window may be combined. For example the output coupler and the output lens may be combined to create a output coupler lens by placing a partially reflective (to the lasing power) coating on the output lens. The window and the output lens may also be combined by making a suitable window material convex so as to focus the lasing power into a high energy beam. Likewise, the output lens, output coupler, and window may all be combined into a partially reflective focusing window by making a suitable window material convex so as to focus the lasing power into a high energy beam, and adding a partially reflective coating on the window.

Figure 1B:
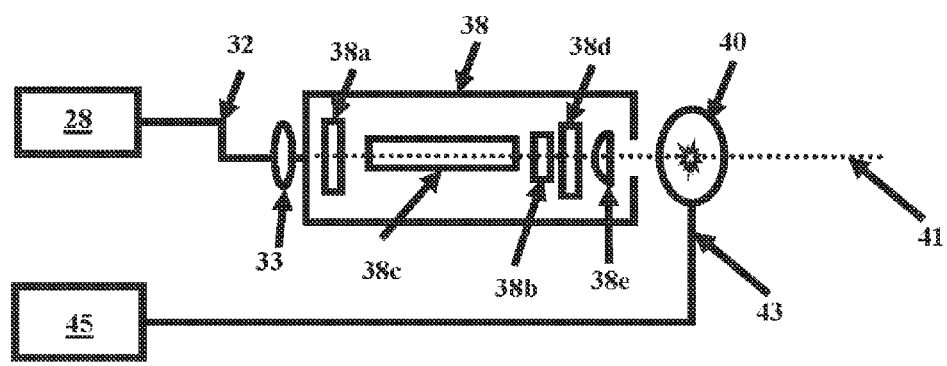
FIG. 1b depicts one embodiment of a device for a remote sensor using a low peak power optical pump whereby an optical fiber optically connects the sample area to the optical response analyzer and the Q-Switch is adjacent to the optical coupler.

In an alternative embodiment, the positions of the laser media and the Q-switch are switched, see FIG. 1b. The high reflectivity mirror is positioned adjacent to and optically connected to the laser media along a pumping axis. The laser media is adjacent to and optically connected to the Q-switch along the pumping axis. The Q-switch is adjacent to and optically connected to the output coupler along the pumping axis. The output coupler is adjacent to and optically connected to the output lens along the pumping axis. In an alternative embodiment, preferably for embodiments whereby the optical response analyzer uses RAMAN scattering, the Q-switch is omitted.

In one embodiment, the laser is designed to produce consecutive pulses of lasing power. In one embodiment, the laser produces a train of closely spaced output pulses of lasing power which are passed through an appropriate amplifier. When a less absorbing Q-switch is used, the laser will produce lasing power more quickly with less intense energy, then quickly recharge and fire again and again, as long as the optical pump is on. The lasing power spacing is preferably optimized for the optical pump rate and the Q-switch. For example, a suitable Q-switched laser is described in Composite All-Ceramics, Passively Q-switched Nd:YAG/Cr4+:YAG Monolithic Micro-Laser with Two-Beam Output for Multi-Point Ignition; N. Pavel1,2, M. Tsunekane1, K. Kanehara3, and T. Taira; Optics Express, Vol. 19, Issue 10, pp. 9378-9384 (2011), hereby fully incorporated by reference.

Preferred embodiments of lasers further comprise a submersible housing for remote deployment, for example below ground. In one embodiment, a water resistant housing protects the laser from underground water and pressure. In yet another embodiment, the laser is constructed within or a part of a drill bit, whereby analysis of the drilled area is performed.

FIG. 1a

FIG. 1a depicts one embodiment of a device for a remote sensor using a low peak power optical pump whereby an optical fiber optically connects the sample area to the optical response analyzer and the Q-Switch is adjacent to the high reflectivity mirror. The embodiment shown in FIG. 1a comprises a first optical pumping source 28, a First laser 38, a sample area 40, and an optical response analyzer 45. The first optical pumping source 28 is optically connected to the first laser 38 via a first optical fiber 32. Preferably, a first coupling lens 33 is used to optically couple the output of the first optical fiber 32 with the first laser 38. In an alternative embodiment, the first coupling lens 33 may be omitted. The sample area 40 is optically connected to the optical response analyzer 46 via a response optical fiber 43.

The first laser 38 is capable of producing lasing power to the sample area 40, thereby producing an optical response, which passes through the response optical fiber 43 to the optical response analyzer 45.

The first laser 38 comprises a high reflectivity mirror 38a, a Q-switch 38b, a laser media 38c, an output coupler 38d, and an output lens 38e. The high reflectivity mirror 38a is positioned adjacent to and optically connected to the Q-switch 38b along a pumping axis 41. The Q-switch 38b is adjacent to and optically connected to the laser media 38c along the pumping axis 41. In an alternative embodiment, preferably for embodiments whereby the optical response analyzer uses RAMAN scattering, the Q-switch 38b is omitted, whereby the high reflectivity mirror 38a is positioned adjacent to and optically connected the laser media 38c along the pumping axis 41. The laser media 38c is adjacent to and optically connected to the output coupler 38d along the pumping axis 41. The output coupler 38d is adjacent to and optically connected to the output lens 38e along the pumping axis 41.

The optical pumping energy emitted from the first optical fiber 32 passes through the high reflectivity mirror 38a, passes through the Q-switch 38b, and excites the laser media 38c. The stored excited states of the laser media 38c spontaneously decay producing lasing power in random directions. The lasing power emitted towards the output coupler 38d will be partially reflected back to the laser media 38c. Preferably, the output coupler 38d will reflect less than 50% of the lasing power towards the laser media 38c. Lasing power emitted from the laser media 38c towards the Q-switch 38b is partially absorbed by the Q-switch 38b. Lasing power that is not absorbed by the Q-switch 38b is reflected back towards the Q-switch 38b by the high reflectivity mirror 38a.

The lasing power will reflect back and forth between the high reflectivity mirror 38a, and the output coupler 38d. The lasing power will traverse the laser media 38c and interact with excited Nd atoms within the laser media 38c, inducing stimulated emission where the original photons from the lasing power cause the decay of an excited state. The stimulated event produces light of the same wavelength (about 1064 nm for a Nd:YAG laser media 38c), phase, and in the same direction as the stimulating photon. At the same time the Q-switch 38b allows a certain percentage of the incident photons to pass through unimpeded. The balance of the certain percentage of photons are absorbed within the Q-switch 38b inducing excited states. When the material of the Q-switch 38b is in an excited state it is virtually transparent to the lasing power.

Therefore as more of the lasing power is absorbed effectively make the Q-switch 38b more and more transparent for a short time. This allows more lasing power to pass through and return producing more stimulated lasing power within the laser media 38c.

This process of bleaching the Q-switch 38b allows a large number of excited states to build up within the laser media 38c until the Q-switch 38b reaches a threshold transparency. The Q-switch 38b begins to bleach exponentially and the number of photons within the laser cavity also grows exponentially. At this point, the Q-switch 38c is virtually clear of losses and the large scale lasing depletes the excited states in the laser media 38c within a few round trips. The output lasing power produced is high energy and has very short pulse width. This output lasing power is directed through the output lens 38e and into the sample area 40.

FIG. 1b

FIG. 1b depicts one embodiment of a device for a remote sensor using a low peak power optical pump whereby an optical fiber optically connects the sample area to the optical response analyzer and the Q-Switch is adjacent to the optical coupler. This embodiment is the same as described above in FIG. 1a, with the exception that the Q-switch 38b is positioned adjacent to the optical coupler 38d and the laser media 38c, as shown in FIG. 1b. In an alternative embodiment, preferably for embodiments whereby the optical response analyzer uses RAMAN scattering, the Q-switch is omitted.

FIG. 2a

Figure 2A:
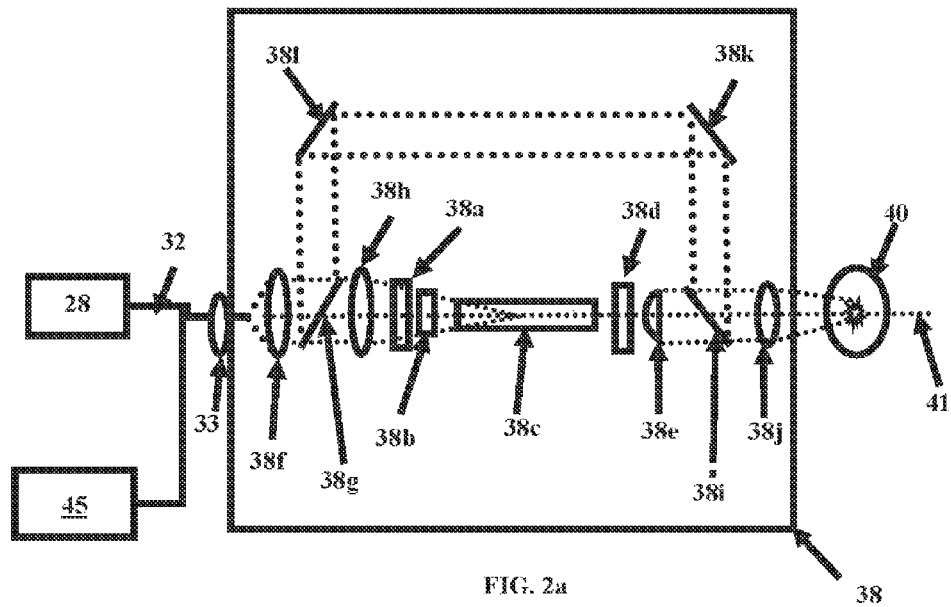
FIG. 2a depicts one embodiment of a device for a remote sensor using a low peak power optical pump whereby the first optical fiber optically connects the sample area to the optical response analyzer and the Q-Switch is adjacent to the high reflectivity mirror.
Figure 2B:
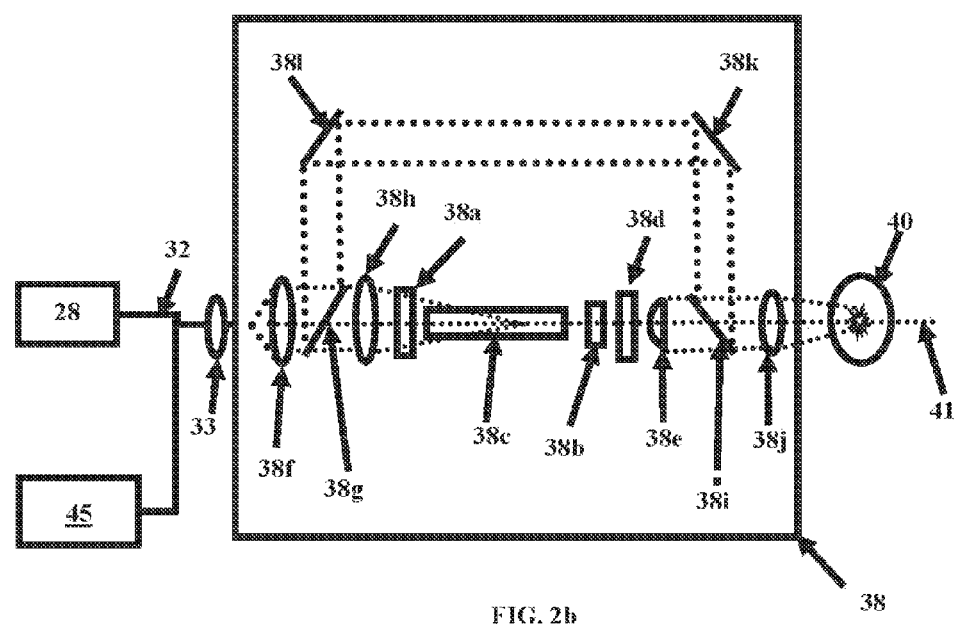
FIG. 2b depicts one embodiment of a device for a remote sensor using a low peak power optical pump whereby the first optical fiber optically connects the sample area to the optical response analyzer and the Q-Switch is adjacent to the optical coupler.

FIG. 2a depicts one embodiment of a device for a remote sensor using a low peak power optical pump whereby the first optical fiber optically connects the sample area to the optical response analyzer and the Q-Switch is adjacent to the high reflectivity mirror. FIG. 2A depicts the device for a remote sensor using a low peak power optical pump shown in FIG. 1a, and described above, with the addition of optics allowing an optical response to pass around the a high reflectivity mirror 38a, a Q-switch 38b, a laser media 38c, an output coupler 38d, and a output lens 38e, described above. Although the Q-switch 38b is depicted adjacent to the high reflectivity mirror 38a, it may alternatively be positioned adjacent to the optical coupler 38d, as shown in FIG. 2b. The embodiment shown in FIG. 2A comprises a first optical pumping source 28, a first laser 38, a sample area 40, and an optical response analyzer 45, as described above. FIG. 2A also comprises a first lens 38f, a first mirror 38g, a second lens 38h, a second mirror 38i, a third lens 38j, a third mirror 38k, and a fourth mirror 38l.

The first optical pumping source 28 is optically connected to the first laser 38 via a first optical fiber 32, as described above. In this embodiment, first lens 38f and the second lens 38h optically couple the output of the first optical fiber 32 with the first laser 38, therefore the first coupling lens 33 shown in FIG. 1a and FIG. 1b is omitted. The first lens 38f, first mirror 38g, second lens 38h, high reflectivity mirror 38a, Q-switch 38b, laser media 38c, output coupler 38d, output lens 38e, second mirror 38i, third lens 38j, and sample area 40 are positioned along a pumping axis 41. The first lens 38f is adjacent and optically connected to the first mirror 38g. The Second lens 38h is adjacent and optically connected to the first mirror 38g. The high reflectivity mirror 38a is adjacent and optically connected to the first lens 38h. The Q-switch 38b is adjacent and optically connected to the high reflectivity mirror 38a. The laser media 38c is adjacent and optically connected to the Q-switch 38b. The output coupler 38d is adjacent and optically connected to the laser media 38c. The output lens 38e is adjacent and optically connected to output coupler 38d. The second mirror 38l is adjacent and optically connected to the output lens 38e. The third lens is adjacent and optically connected to the second mirror 38i.

The second mirror 38l is positioned whereby at least some optical response from the sample area 40 is reflected to the third optical mirror 38k. The third mirror 38k is optically connected to both the second mirror 38i and the fourth mirror 38l. The fourth mirror 38l is optically connected to the first mirror 38g. The fourth mirror 38l is positioned and constructed to reflect at least some optical response from the sample area 40, reflected by the second mirror 38i, the third mirror 38k, and the fourth mirror 38l, towards the first lens 38f. The optical response analyzer 46 is optically connected to the first lens 38f through the first optical fiber 32.

As the optical pumping energy passes into the first laser 38, it passes first through the first lens 38f, through the first mirror 38g, the second lens 38h, the high reflectivity mirror 38a, and the q-switch 38b, to the laser media 38c. Lasing power produced at the laser media 38c passes through the output coupler 38d, the second mirror 38i, and the third lens 38j to the sample area 40. Any optical response from the sample area 40 passes through the third lens 38j, the second mirror 38i, the third mirror 38k, the fourth mirror 38l, the first mirror 38g, the first lens 38f, and out the first optical fiber 32, which is connected to optical response analyzer 46.

FIG. 2b

FIG. 2b depicts one embodiment of a device for a remote sensor using a low peak power optical pump whereby the first optical fiber optically connects the sample area to the optical response analyzer and the Q-Switch is adjacent to the optical coupler. This embodiment is the same as described above in FIG. 1b, with the exception that the Q-switch 38b is positioned adjacent to the optical coupler 38d and the laser media 38c, as shown in FIG. 2b. In an alternative embodiment, preferably for embodiments whereby the optical response analyzer uses RAMAN scattering, the Q-switch is omitted.

FIG. 3a

Figure 3A:
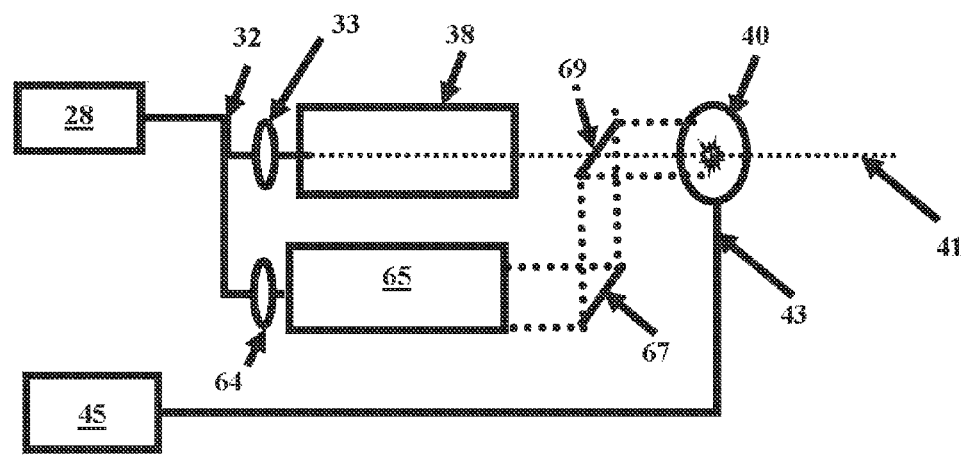
FIG. 3a depicts one embodiment of a device for a remote sensor using a low peak power optical pump producing two lasing power emissions using a single pumping source.

FIG. 3a depicts one embodiment of a device for a remote sensor using a low peak power optical pump producing two lasing power emissions using a single pumping source. As shown in FIG. 3a, a first optical pumping source 28 is connected to a first laser 38 and a second laser 66 via a first optical fiber 32. Preferably, a first coupling lens 33 is used to optically couple the output of the first optical fiber 32 with the first laser 38. In an alternative embodiment, the first coupling lens 33 may be omitted. Preferably, a second coupling lens 64 is used to optically couple the output of the second optical fiber 63 with the second laser 66. In an alternative embodiment, the second coupling lens 64 may be omitted. The first laser 38 produces lasing power to the sample area 40. The Second laser 65 is optically connected to a fifth mirror 67. The first mirror is optically connected to a sixth mirror 69. The sixth mirror 69 is optically connected to the sample area 40. An optical response analyzer 45 is optically connected to the sample areas 40 via a response optical fiber 43. The second laser 66 produces lasing power directed to the fifth mirror 67, to the sixth mirror 69, which reflects of the sixth mirror 69 to the sample area 40. This embodiment is preferred in embodiments whereby the optical response analyses employed LIBS, as two lasing power emissions are produced.

FIG. 3b

Figure 3B:
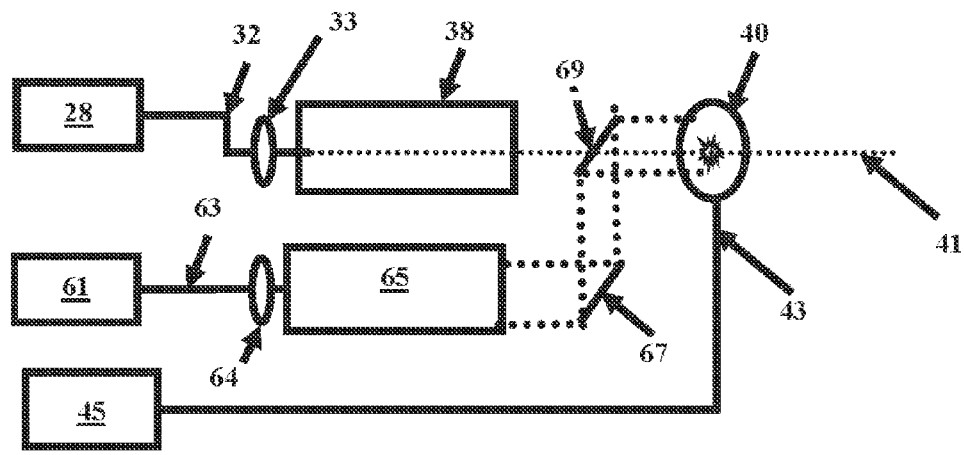
FIG. 3b depicts one embodiment of a device for a remote sensor using a low peak power optical pump producing two lasing power emissions using a plurality of pumping sources.

FIG. 3b depicts one embodiment of a device for a remote sensor using a low peak power optical pump producing two lasing power emissions using a plurality of pumping sources. As shown in FIG. 3b, a first optical pumping source 28 is connected to a first laser 38 via a first optical fiber 32. Preferably, a first coupling lens 33 is used to optically couple the output of the first optical fiber 32 with the first laser 38. In an alternative embodiment, the first coupling lens 33 may be omitted. The first laser 38 produces lasing power to the sample area 40. A second optical pumping source 61 is connected to a second laser 65 via a second optical fiber 63. Preferably, a second coupling lens 64 is used to optically couple the output of the second optical fiber 63 with the second laser 66. In an alternative embodiment, the second coupling lens 64 may be omitted. The second laser 65 is optically connected to a fifth mirror 67. The fifth mirror 67 is optically connected to a sixth mirror 69. The sixth mirror 69 is optically connected to the sample area 40. An optical response analyzer 45 is optically connected to the sample areas 40 via a response optical fiber 43. The second laser 65 produces lasing power directed to the fifth mirror 67, to the sixth mirror 69, which reflects off the sixth mirror 69 to the sample area 40. This embodiment is preferred in embodiments whereby the optical response analyses employed LIBS, as two lasing power emissions are produced. In an alternative embodiment, preferably for embodiments whereby the optical response analyzer uses RAMAN scattering, the Q-switch is omitted.

FIG. 4a

Figure 4A:
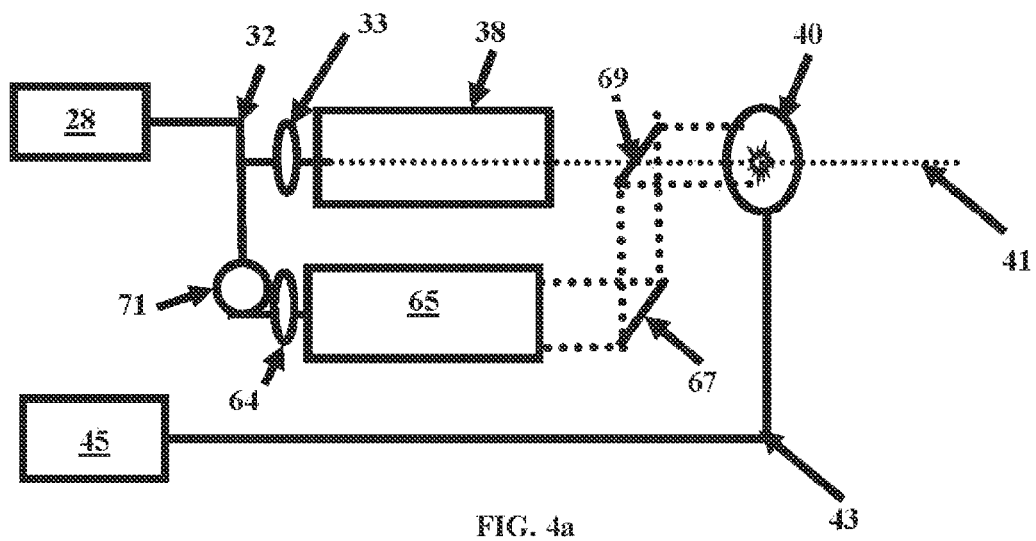
FIG. 4a depicts one embodiment of a device for a remote sensor using a low peak power optical pump producing two lasing power emissions, whereby one pulse is delayed using an optical fiber delay path.

FIG. 4a depicts one embodiment of a device for a remote sensor using a low peak power optical pump producing two lasing power emissions, whereby one pulse is delayed using an optical fiber delay path. As shown in FIG. 4a, a first optical pumping source 28 is connected to a first laser 38 and an optical fiber delay path 71 via a first optical fiber 32. Preferably, a first coupling lens 33 is used to optically couple the output of the first optical fiber 32 with the first laser 38. In an alternative embodiment, the first coupling lens 33 may be omitted. Preferably, a second coupling lens 64 is used to optically couple the output of the optical fiber delay path 71 with the second laser 65. In an alternative embodiment, the second coupling lens 64 may be omitted. The optical fiber delay path 71 is optically connected to a second laser 65. The first laser 38 produces lasing power to the sample area 40. The Second laser 65 is optically connected to a fifth mirror 67. The first mirror is optically connected to a sixth mirror 69. The sixth mirror 69 is optically connected to the sample area 40. An optical response analyzer 46 is optically connected to the sample areas 40 via a response optical fiber 43. The second laser 65 produces lasing power directed to the fifth mirror 67, to the sixth mirror 69, which reflects of the sixth mirror 69 to the sample area 40. This embodiment is preferred in embodiments whereby the optical response analyses employed LIBS, as two lasing power emissions are produced. The optical fiber delay path 71 is a preferred embodiment to control the time difference between the two pulses. This embodiment is preferred for embodiments whereby the optical response analyzer 45 uses LIBS, particularly when a delay on the order of microseconds to tens of microseconds is desired. The first pulse will create a small bubble or void and the second will vaporize and initiate plasma/beam, production within the bubble or void. This technique is preferred as it may create a larger signal to collect and analyze, depending on the fluid and fluid conditions.

FIG. 4b

Figure 4B:
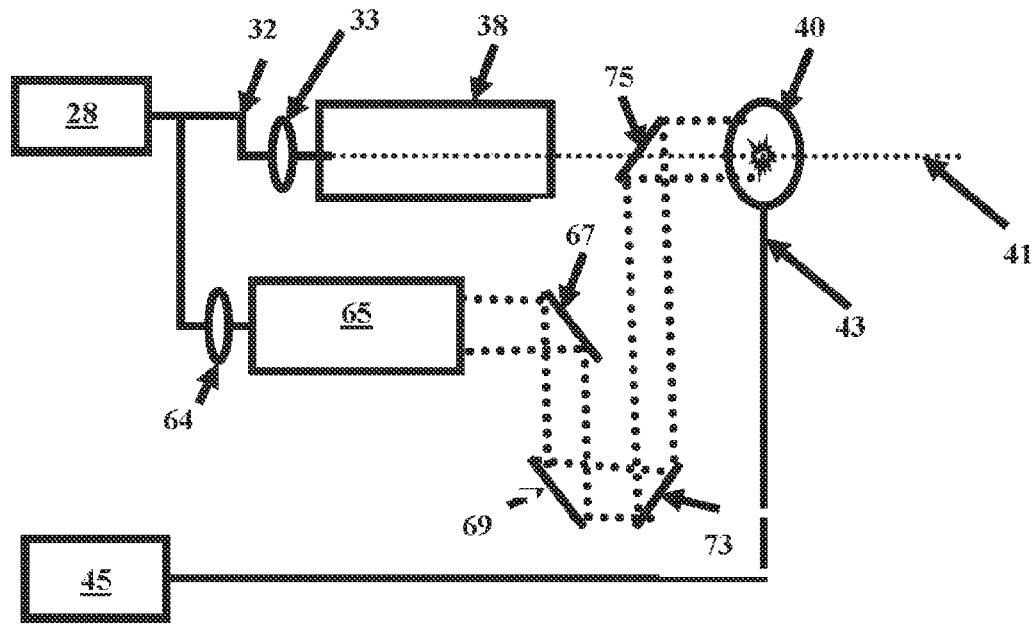
FIG. 4b depicts one embodiment of a device for a remote sensor using a low peak power optical pump producing two lasing power emissions, whereby one pulse is delayed using an mirror delay path.

FIG. 4b depicts one embodiment of a device for a remote sensor using a low peak power optical pump producing two lasing power emissions, whereby one pulse is delayed using an mirror delay path. As shown in FIG. 4b, a first optical pumping source 28 is connected to a first laser 38 and a second laser 65 via a first optical fiber 32. Preferably, a first coupling lens 33 is used to optically couple the output of the first optical fiber 32 with the first laser 38. In an alternative embodiment, the first coupling lens 33 may be omitted. Preferably, a second coupling lens 64 is used to optically couple the output of the second optical fiber 63 with the second laser 65. In an alternative embodiment, the second coupling lens 64 may be omitted. The first laser 38 produces lasing power to the sample area 40. The Second laser 66 is optically connected to a fifth mirror 67. The first mirror is optically connected to a sixth mirror 69. The sixth mirror 69 is optically connected to a seventh mirror 73. The seventh mirror 73 is optically connected to a eighth mirror 75. The eighth mirror 75 is optically connected to the sample area 40. An optical response analyzer 46 is optically connected to the sample areas 40 via a response optical fiber 43. The second laser 65 produces lasing power directed to the fifth mirror 67, to the sixth mirror 69, the seventh mirror 73, and the eighth mirror 75, which reflects of the eighth mirror 76 to the sample area 40. This embodiment is preferred in embodiments whereby the optical response analyses employed LIBS, as two lasing power emissions are produced. The optical distance between the fifth mirror 67, sixth mirror 69, seventh mirror 73, and eighth mirror 75 are preferably optimized to control the time difference between the two pulses. This embodiment is preferred for embodiments whereby the optical response analyzer 46 uses LIBS, particularly when a delay on the order of nanoseconds is desired. The first pulse will create a small bubble or void and the second will vaporize and initiate plasma/beam production within the bubble or void. This technique is preferred as it may create a larger signal to collect and analyze, depending on the fluid and fluid conditions.

FIG. 5

Figure 5:
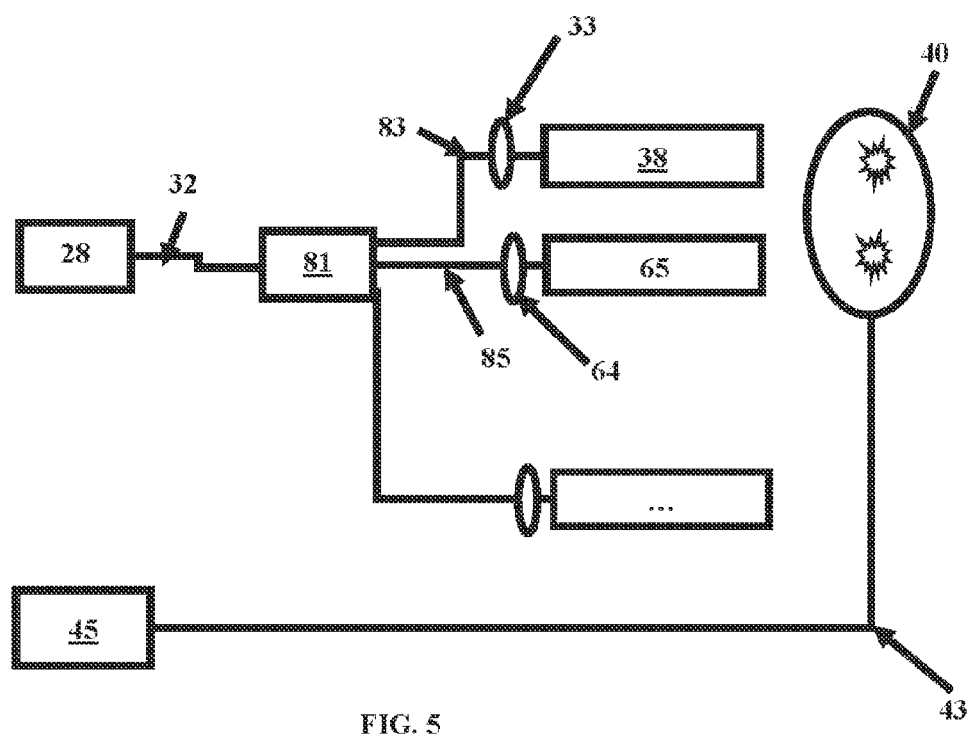
FIG. 5 depicts one embodiment of a device for a remote sensor using a low peak power optical pump using a distributor and a single optical fiber for both pumping and the optical response.

FIG. 5 depicts one embodiment of a device for a remote sensor using a low peak power optical pump using a distributor and a single optical fiber for both pumping and the optical response. As shown in FIG. 5, a first optical pumping source 28 is connected to an optical distributor 81 via a first optical fiber 32. The optical distributor 81 is optically connected to a first laser 38 via a first distributor output optical fiber 83. Preferably, a first coupling lens 33 is used to optically couple the output of first distributor output optical fiber 83 with the first laser 38. In an alternative embodiment, the first coupling lens 33 may be omitted. The optical distributor 81 is optically connected to a second laser 65 via a second distributor output optical fiber 85. Preferably, a second coupling lens 64 is used to optically couple the output of the second distributor output optical fiber 85 with the second laser 66. In an alternative embodiment, the second coupling lens 64 may be omitted. The first laser 38 and the second laser 65 are both optically connected to the sample area 40. An optical response analyzer 45 is optically connected to the sample areas 40 via a response optical fiber 43. Although only a first laser 38 and a second laser 66 are shown, any number of lasers may be utilized.

The optical distributor 81 preferably is a rotating element, preferably a lens, a prism, or a mirror for deflecting light at a select angle from its axis of rotation. The rotation may be continuous or stepwise. When the rotation is stepwise, the optical distributor 81 is preferably either a mirror or a lens, but there is no restriction on the angle of deflection, since dwell time is determined by the stepping mechanism. A shallow angle deflection is preferred since it requires much less precision in the controlling motor, making for a more economical apparatus.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. A device for remote optical detection comprising:
   a. one or more optical pumping sources, one or more lasers; and an optical response analyzer;
   b. each pumping source from said one or more optical pumping sources creating a pumping energy;
   c. said one or more lasers each comprising:
      i. a high reflectivity mirror, a laser media, an output coupler, and an output lens;
      ii. said laser media made of a material that emits a lasing power when exposed to said pumping energy;
      iii. said lasing power having a peak power greater than the peak power of said pumping energy;
      iv. said high reflectivity mirror reflective to said lasing power and transmissive to said pumping energy;
      v. said laser media optically connected to and positioned between said high reflectivity mirror and said output coupler along a pumping axis; and
      vi. said output lens optically connected to said output coupler and a sample area;
   d. each said high reflectivity mirror optically connected to an optical pumping source from said one or more optical pumping sources via an optical connection comprising one or more first optical fibers; and
   e. said sample area optically connected to said optical response analyzer; and
   f. further comprising at least one laser further comprising:
      i. a first lens, a first mirror, a second lens, a second mirror, a third lens, a third mirror, and a fourth mirror;
      ii. said first mirror optically connected to and positioned between said first lens and said second lens along said pumping axis;
      iii. said high reflectivity mirror, said Q-switch, said laser media, said optical coupler, and said output lens positioned between said second lens and said second mirror along said pumping axis;
      iv. said second mirror optically connected to and positioned between said output lens and said third lens along said pumping axis;
      v. said third lens optically connected to said second mirror and said sample area along said pumping axis;
      vi. said third mirror optically connected to said second mirror;
      vii. said third mirror optically connected to said fourth mirror; and
      viii. said fourth mirror optically connected to said first mirror; and
   g. whereby:
      i. said sample area is optically connected to said optical response analyzer through an optical path comprising at least part of said one or more first optical fibers; and
      ii. said optical response analyzer receives and analyzes optical responses from said sample area.

2. The device for remote optical detection of claim 1 whereby:
   a. at least one laser comprising an output lens optically connected to and between its corresponding output coupler and said sample area along its pumping axis.

3. The device for remote optical detection of claim 1 whereby:
   a. at least one laser from said one or more lasers further comprises:
      i. a Q-switch and
      ii. said Q-switch optically connected to and positioned between said high reflectivity mirror and said optical coupler along said pumping axis.

4. The device for remote optical detection of claim 3 further comprising:
   a. said Q-switch optically connected to and positioned between said high reflectivity mirror and said laser media.

5. The device for remote optical detection of claim 3 further comprising:
   a. said Q-switch optically connected to and positioned between said laser media and said output coupler.

6. The device for remote optical detection of claim 1 whereby:
   a. said sample area optically connected to said optical response analyzer through a response optical fiber; and
   b. said response optical fiber separate and distinct from said one or more first optical fibers.

7. The device for remote optical detection of claim 1 whereby:
   a. said optical response analyzer uses laser-induced breakdown spectroscopy (LIBS).

8. The device for remote optical detection of claim 1 whereby:
   a. said optical response analyzer uses RAMAN scattering.

9. The device for remote optical detection of claim 8 whereby said one or more optical pumping sources comprises:
   i. a first optical pumping source optically connected to said first laser; and said second laser.

10. The device for remote optical detection of claim 8 whereby said one or more optical pumping sources comprises:
    i. a first optical pumping source optically connected to said first laser; and
    ii. a second optical pumping source optically connected to said second laser.

11. The device for remote optical detection of claim 1:
    a. whereby:

i. said one or more lasers comprises a first laser and a second laser;
ii. said output lens of said first laser positioned between said output coupler of said first laser and said sample area along said pumping axis of said first laser; and b. further comprising:
i. a fifth mirror and a sixth mirror;
ii. said fifth mirror optically connected to said high reflectivity mirror of said second laser;
iii. said sixth mirror optically connected to said fifth mirror; and
iv. said sixth mirror optically connected to said sample area.

12. The device for remote optical detection of claim 1 further comprising:
a. said one or more lasers comprising a first laser and a second laser; and
b. said high reflectivity mirror of said first laser optically connected to an optical pumping source from said one or more optical pumping sources along said said pumping axis via an optical connection comprising a first optical fiber;
c. said high reflectivity mirror of said second laser optically connected to an optical pumping source from said one or more optical pumping sources along said pumping axis via an optical connection comprising a second optical fiber; and
d. said second optical fiber have a length longer than the length of said first optical fiber.

13. The device for remote optical detection of claim 1:
a. whereby:
i. said one or more lasers comprises a first laser and a second laser; and
ii. said one or more optical pumping sources comprises a first optical pumping source optically connected to said first laser and said second laser; and
b. further comprising:
i. a fifth mirror, a sixth mirror, a seventh mirror, and an eighth mirror;
ii. said fifth mirror optically connected to said high reflectivity mirror of said second laser;
iii. said sixth mirror optically connected to said fifth mirror;
iv. said seventh mirror optically connected to said sixth mirror;
v. said eighth mirror optically connected to said seventh mirror; and
vi. said eighth mirror optically connected to said sample area.

14. The device for remote optical detection of claim 1 further comprising:
a. an optical distributor;
b. said first optical pumping source optically connected to said optical distributor; and
c. said optical distributor optically connected to said high reflectivity mirror of each said laser via an optical connection comprising a corresponding optical fiber from said one or more first optical fibers.

15. The device for remote optical detection of claim 1 further comprising:
a. a coupling lens optically connected to and positioned between the output of said one or more first optical fibers and each said high reflectivity mirror along said pumping axis of each said laser.

* * * * *